United States Patent [19]

Bishop et al.

[11] Patent Number: 5,767,997
[45] Date of Patent: Jun. 16, 1998

[54] METHOD AND ARRANGEMENT FOR A COMBINED MODULATOR/ PHOTODETECTOR

[75] Inventors: David John Bishop, Summit; Keith Wayne Goossen, Aberdeen; James A. Walker, Howell, all of N.J.

[73] Assignee: Lucent Technologies Inc., Murray Hill, N.J.

[21] Appl. No.: 675,980

[22] Filed: Jul. 5, 1996

[51] Int. Cl.[6] ............................................. H04B 10/00
[52] U.S. Cl. ............................ 359/152; 359/237; 257/84
[58] Field of Search .................................. 359/152, 173, 359/237; 257/84

[56] References Cited

U.S. PATENT DOCUMENTS

| | | | |
|---|---|---|---|
| 4,989,934 | 2/1991 | Zavracky et al. | 350/96.11 |
| 5,448,077 | 9/1995 | Krause | 250/551 |
| 5,479,539 | 12/1995 | Goldsmith et al. | 385/14 |
| 5,526,160 | 6/1996 | Watanabe et al. | 359/163 |
| 5,552,918 | 9/1996 | Krug et al. | 359/152 |

*Primary Examiner*—Mark Hellner

[57] ABSTRACT

Apparatus and methods for a combined optical modulator/ photodetector are disclosed. A modulator chip is attached to a photodetector chip using a non-conductive epoxy or solder. The combined modulator/photodetector can be configured in at least two ways. In one configuration, the modulator is located on the upper surface of a chip that is attached, at its lower surface, to a photodetector containing chip. In another configuration, the modulator is located on the lower surface of the modulator chip, which is again attached at its lower surface to the photodetector chip. By combining the modulator and photodetector in the manner described above, they can be placed in a single package, resulting in reduced packaging costs versus a separately packaged modulator and a separately packaged photodetector. Moreover, feedback from the photodetector can used to optimize the operation of micromechanical optical modulators.

22 Claims, 5 Drawing Sheets

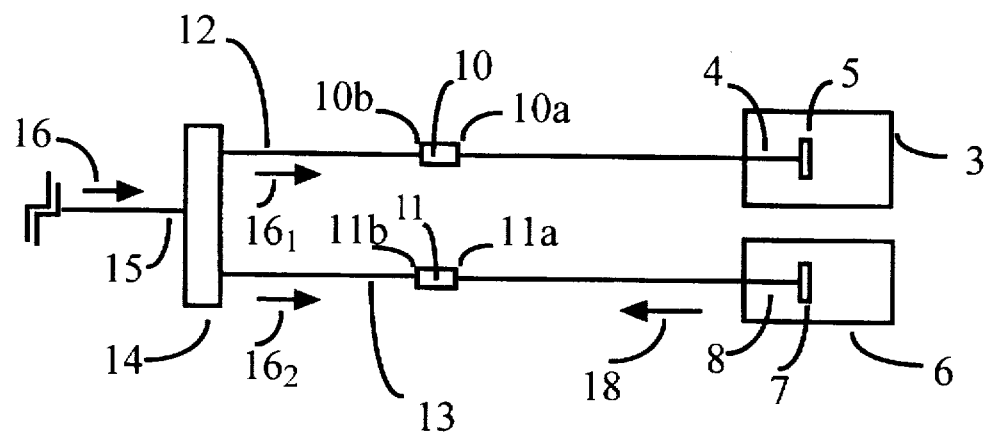
FIG. 1 - PRIOR ART
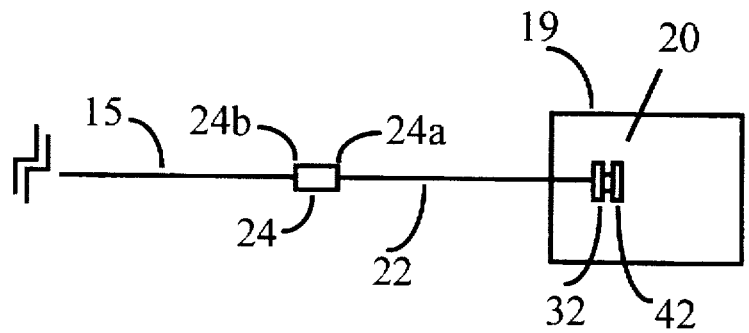
FIG. 2

METHOD AND ARRANGEMENT FOR A COMBINED MODULATOR/ PHOTODETECTOR

FIELD OF THE INVENTION

The present invention relates to photodetectors and optical modulators. More particularly, the present invention relates to an integrated modulator/photodetector.

BACKGROUND OF THE INVENTION

Optical communication systems employ various photonic devices, such as photodetectors and optical modulators, for accomplishing a variety of processing tasks. Typically, these devices are separately packaged, along with an optical fiber, for incorporation into the optical communication system.

The cost of such photonics packages is typically controlled, especially at high production volumes, by items other than the photonics device themselves. For example, at high production volumes, the overall cost of some photodetector packages and optical modulator packages is dominated by the cost of the included optical fiber. Thus, it would be desirable to package such devices in a way that reduces packaging costs.

SUMMARY OF THE INVENTION

Methods and apparatus for a combined optical modulator/ photodetector are disclosed. According to the present invention, a modulator is integrated with a detector using one of a variety of illustrative methods. In a first illustrative embodiment, a relatively smaller modulator chip upon which a modulator is disposed, is attached to a relatively larger photodetector chip upon which a photodetector is disposed. In the first embodiment, the chips are attached using a non-conductive epoxy in conjunction with gross alignment features. In another embodiment, the modulator and detector chips are attached using solder and flip-chip bonding techniques.

The combined modulator/photodetector can be configured in at least two ways. In an exemplary first embodiment, the modulator is disposed on a first surface of a modulator chip that is attached, at a second surface, to the photodetector chip. In such a configuration, referred to as a "modulator-up" configuration, the modulator and the detector are separated by the thickness of the modulator chip, i.e., the thickness of the substrate. In a second configuration, the modulator is disposed on the second surface of the substrate. In the second configuration, the modulator chip is again attached at its second surface to the photodetector chip. Thus, in the second configuration, referred to as a "modulator-down" configuration, the modulator and photodetector are not separated by the thickness of the substrate.

By combining the modulator and photodetector in the manner described above, they can be placed in a single package, resulting in reduced costs versus a separately packaged modulator and a separately packaged photodetector. Among other cost reducing features, such an integrated package can be implemented using one optical fiber, reducing the total fiber count by one compared to a separately package modulator and a separately packaged photodetector. Moreover, for micromechanical optical modulators, the aforementioned combined arrangement facilitates using electrical feedback to optimize modulator operation.

BRIEF DESCRIPTION OF THE DRAWINGS

Further features of the invention will become more apparent from the following detailed description of specific embodiments thereof when read in conjunction with the accompanying drawings, in which like elements have like reference numerals and in which:

FIG. 1 shows a portion of a fiber-optic communications system utilizing a separately packaged photodetector and modulator according to the prior art;

FIG. 2 shows a portion of a fiber-optic communications system utilizing a combined optical modulator/ photodetector according to the present invention;

DETAILED DESCRIPTION

Figure 3:
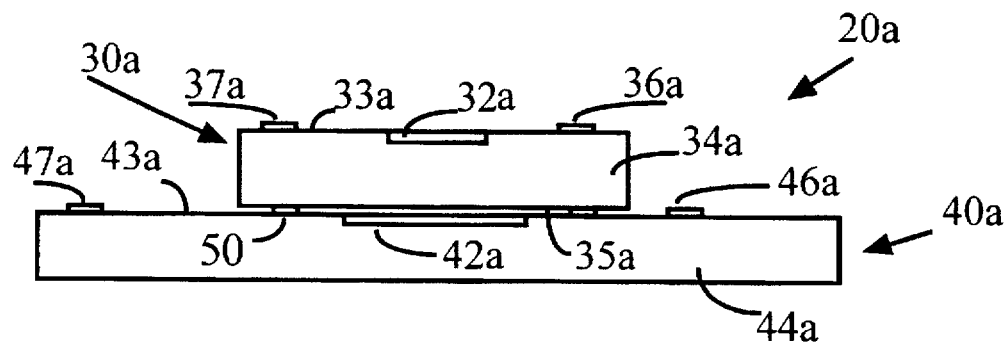
FIG. 3 is a first embodiment of a combined optical modulator/photodetector according to the present invention.

FIG. 1 shows a portion 1a of an optical communications system including a separately packaged photodetector and modulator, according to the prior art. The photodetector package 3 includes an optical fiber 4 and a photodetector 5. The optical fiber 4 from the photodetector package 3 is received by a first end 10a of an optical connector 10. An optical fiber 12 is connected, at one end, to the second end 10b of the optical connector 10. The other end of the optical fiber 12 is connected to a splitter 14.

The modulator package 6 includes an optical modulator 7 and an optical fiber 8. The optical fiber 8 from the optical modulator package 6 is received by a first end 11 a of an optical connector 11. An optical fiber 13 is connected, at one end, to the second end 1a of the optical connector 11. The other end of the optical fiber 13 is connected to the splitter 14.

An optical fiber 15 for delivering an incoming optical signal 16 to the photodetector 5 and the optical modulator 7, and receiving an outgoing optical signal 18 from the optical modulator 7, is also connected to the splitter 14.

In operation, the optical fiber 15 carries the incoming optical signal 16 to the splitter 14. As is well known in the art, information carried by the incoming optical signal 16 can be organized into "packets." The incoming optical signal 16 thus illustratively comprises an information containing packet or portion, and a continuous wave (CW) portion, not shown. Typically, the CW portion of the incoming optical 16 does not contain information. Using methods well known in the art, the splitter 14 sends a first portion $16_1$, of the optical energy of the incoming optical signal 16 along the optical fiber 12 to the optical fiber 4 and ultimately to the photodetector 5. The splitter 14 directs a second portion $16_2$ of the optical energy of the incoming optical signal 16 along the optical fiber 13 to the optical fiber 8 and finally to the optical modulator 7.

Such an arrangement has been proposed, for example, in telecommunications applications, wherein the detector 5 forms part of the receiving circuitry and the modulator 10 forms part of the transmitter circuitry. In such a case, the information containing portion of the incoming optical signal corresponds to an incoming voice signal. The CW portion provides an optical chalkboard upon which the optical modulator 10 can write outgoing information, e.g., a voice signal, generating an outgoing optical signal 18.

FIG. 2 shows a portion 1b of an optical communications systems utilizing a combined optical modulator/photodetector ("OMP") 20 according to the present invention. The OMP 20 consists of an optical modulator 32 and a photodetector 42 that have been attached to one another using any one of a variety of methods, as described below. The OMP 20 may be incorporated into a single photonics package 19, which, in addition to the OMP 20, includes an electrical header, a container and, optionally, an optical fiber. Incorporation of the OMP 20 into the single photonics package 19 will be described in more detail later in this specification.

The optical modulator 32 and the photodetector 42 are arranged so that an incoming optical signal, such as the optical signal 16, reaches the optical modulator 32 before the photodetector 42. Various embodiments of an OMP 20 are shown in FIGS. 3, 4, 6 and 7, and are described later in this specification. The modulator and photodetector for each of the described embodiments of an OMP according to the present invention are identified by a letter appended to the reference numerals 32 and 42, respectively. The letter identifies the modulator or photodetector as belonging to a particular embodiment of an OMP. For example, in FIG. 3, the OMP 20a includes a modulator 32a and a photodetector 42a. Similarly, the OMP 20b shown in FIG. 4 includes a modulator 32b and a photodetector 32b. When referring to a specific embodiment of an OMP, the letter designation will be appended to the reference numerals for the modulator and the photodetector. When referring to all embodiments of the OMP, the letter designation will be omitted.

As shown in FIG. 2, an optional optical fiber 22 from the photonics package 19 is attached to a first end 24a of an optical connector 24. A fiber 15 is attached to a second end 24b of the optical connector 24. To deliver the first portion 16₁ of the power of the incoming optical signal 16 to the photodetector, the optical modulator 32 is placed in an at least partially transmissive state or mode. As such, the first portion 16₁ passes through the optical modulator 32 and is received by the photodetector 42. The relative amounts of power directed to the optical modulator 32 and the photodetector 42 are typically determined in accordance with the requirements of the optical communications system.

The photodetector 42 and a first group of processing devices, not shown, process the information contained in the received first portion 16₁ of the optical signal. A second group of processing devices, not shown, which includes the controlled voltage source, directs the optical modulator 32 to encode information on the CW portion of the second portion 16₂ of the optical signal. In a preferred embodiment, such information encoding is accomplished by switching the state of the modulator 32 between a reflective state and a non-reflective (transmissive) state.

FIG. 3 shows a first embodiment of a combined optical modulator/photodetector 20a according to the present invention. The OMP 20a consists of a modulator chip 30a attached to a photodetector chip 40a. The modulator chip 30a includes a substrate 34a having a first surface 33a and a second surface 35a. In the illustrative embodiment shown in FIG. 3, as in the illustrative embodiments shown in FIGS. 4–6, the substrate 34a, and 34b–d, respectively, are silicon. An optical modulator 32a, described in more detail below, is located along the first surface 33a of the substrate 34a. Contacts or wire bond pads 36a and 37a are in electrical contact with a controlled voltage source, not shown, and are also in electrical contact, respectively, with a feature of the modulator 32a, as described in more detail below, and the substrate 34a.

The photodetector chip 40a includes a III–V substrate 44a having a first surface 43a. In the illustrative embodiment shown in FIG. 3, as in the illustrative embodiments shown in FIGS. 4–6, the III–V substrate 44a, and 44b–d, respectively, are indium phosphide (InP). A photodetector 42a is located along the first surface 43a of the III–V substrate. The photodetector chip 40a can be electrically connected to equipment, not shown, for processing and receiving the electrical signal generated by the photodetector, through contacts or wire bond pads 46a and 47a.

In the first embodiment shown in FIG. 3, the modulator chip 30a and the photodetector chip 40a are attached using a non-conductive epoxy 50. Epoxies are widely used for attaching electronic chips and the like. Epoxies for such applications are widely available; one of the many epoxies suitable for use in conjunction with the present invention is available from Norland Products Inc. of New Brunswick, N.J., under the designation Norland Optical Adhesive type 81, which is a UV-curable epoxy. Epoxy is applied, as either a liquid or a preform, to the surface 35a of the substrate 34a or to the surface 43a of the III–V substrate 44a. UV-curable epoxy, such as Norland Optical Adhesive type 81, is activated by exposure to ultraviolet light. Other types of adhesive, such as thermally-activable epoxies, may also be used for bonding the modulator chip 30a to the photodetector chip 40a.

Figure 4:
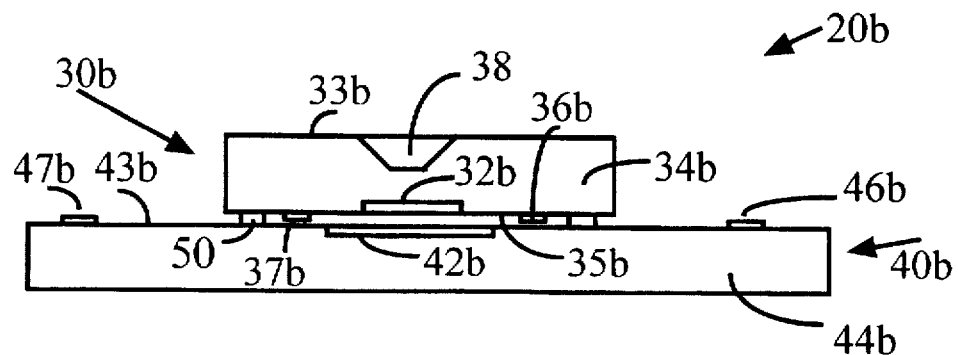
FIG. 4 is a second embodiment of a combined optical modulator/photodetector according to the present invention.

FIG. 4 shows a second embodiment of an OMP 20b according to the present invention. The OMP 20b consists of a modulator chip 30b attached to the photodetector chip 40b. The modulator chip 30b includes a substrate 34b having a first surface 33b and a second surface 35b. The modulator chip 30b differs from the modulator chip 30a in that the optical modulator 32b is located along the second surface 35b of the substrate 34b. This embodiment is referred to as "the modulator down" configuration. The first embodiment is referred to as "the modulator up" configuration. The photodetector 42b can be smaller in size then the detector 42a since, in the modulator down configuration, there is less spatial divergence of the optical signal between the optical modulator and the photodetector. This results from the shorter optical path between the optical modulator 32b and the photodetector 42b when the optical modulator is disposed on the surface 35b, rather than the surface 33b, of the substrate 34b.

In a preferred embodiment, an adaptation is formed in the first surface 33b of the substrate 34b for receiving an optical fiber. The adaptation can be, for example, a well 38. The received optical fiber can be packaged with the OMP 20b. Alternatively, the received optical fiber can be part of the optical communications system into which the packaged OMP 20b is being integrated. The well 38 can be formed by methods well known in the art, such as, reactive ion etching, ion milling, or, more preferably, crystallographic dependent etching using, for example, potassium hydroxide, ethylenediarninepyrocatechol (EDP) or hydrazine. Contacts 36b, 37b, 46b and 47b provide electrical connection as described for the previous embodiment.

Using epoxy for attaching the modulator chip 30a, 30b to the photodetector chip 40a, 40b as described above, is perhaps the least complex method for forming the combined optical modulator/photodetectors 20a and 20b. Such a method is, however, less precise than most other methods, such as the so-called "flip-chip bonding" method described below. In order to minimize problems in aligning the optical modulator 32a, 32b with the photodetector 42a, 42b when joining such devices using epoxy, the photodetector should be relatively large compared to the size of the modulator. Furthermore, coarse alignment features, such as metal centering lines on the modulator chip and the photodetector chip, can be used to aid in aligning the devices.

As mentioned above, in a second method, the optical modulator chip and the photodetector chip are attached using flip-chip bonding. Flip-chip bonding, which is well-known in the art, utilizes solder for attaching for attaching chips. Such solder attachment can be performed with higher precision than epoxy attachment. As such, a photodetector 42c, 42d smaller than the photodetector 42a or 42b, and similar in size to the optical modulator 32 can be used. This is beneficial since a relatively smaller photodetector 42c, 42d results in a relatively larger operating bandwidth. Moreover, the solder used to join the chips can also provide electrical interconnection.

Figure 5:
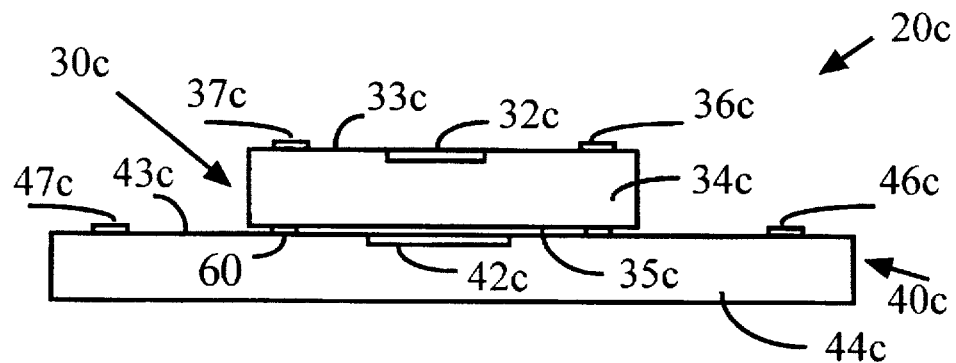
FIG. 5 is a third embodiment of a combined optical modulator/photodetector according to the present invention.
Figure 6:
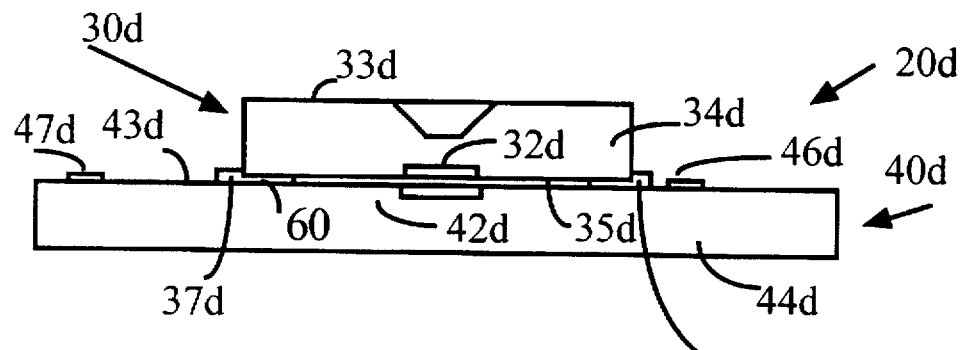
FIG. 6 is a fourth embodiment of a combined optical modulator/photodetector according to the present invention.

FIGS. 5 and 6 show solder-attached OMPs 20c and 20d, respectively. As with the epoxy-attached chips, solder-attached chips can have a modulator-up or a modulator-down configuration. The OMP 20c has a modulator-up configuration, while the OMP 20d has a modulator-down configuration.

The OMPs 20c and 20d are very similar to the OMPs 20a and 20b. Notable differences include the smaller size of the photodetectors 42c and 42d in comparison with the photodetectors 42a and 42b, and substitution of solder 60 for the epoxy 50.

Figure 7:
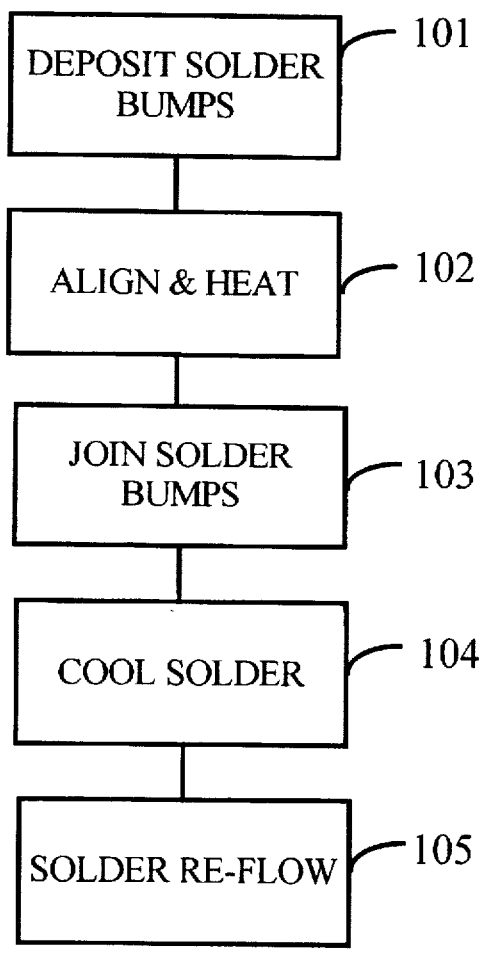
FIG. 7 is a flow diagram illustrating an embodiment of a method according to the present invention for forming the single package modulator/photodetector of FIGS. 5 & 6.

FIG. 7 is a flow-diagram illustrating a method for forming an OMP 20 according to the present invention. In operation block 101, solder bumps 60 are placed on both the optical modulator chip 30c or 30d and the photodetector chip 40c or 40d in suitable, precisely-determined locations. Four bumps placed on the appropriate surface of each chip are sufficient for the present application. Solder is deposited on the chips using evaporation, silkscreening, plating or other methods known to those skilled in the art.

The chips are heated and aligned in operation block 102. After the solder has melted, the solder bumps 60 from each chip are brought into contact, as indicated in operation block 103. As indicated in operation block 104, the chips are then cooled to solidify the solder. Optionally, the solder can be re-flowed as noted in operation block 105. Solder re-flow, which is accomplished by reheating the chips, improves chip alignment, assuming that the solder was originally deposited in the correct locations on the chips 30c, 30d and 40c, 40d. Solder re-flow is well known to those skilled in the art. It will be appreciated that the solder used for bonding the chips must melt at a temperature tolerable to the optical modulator chip 30c, 30d and the photodetector chip 40c, 40d.

In a further preferred embodiment of the present invention, the surfaces 35a–d and 43a–d of OMPs a–d are coated with an antireflection layer to minimize backscatter. Minimizing backscatter results in improved modulator performance, i.e., contrast.

Exemplary embodiments of an OMP 20 according to the present invention, and methods for making an OMP, have been described. Further description of the photodetectors 42 and optical modulators 32 suitable for use in conjunction with the present invention is provided below.

Any type of photodetector having a suitable size and operating characteristics can be used in conjunction with the present invention. Such photodetectors, which are typically reverse-biased PIN structures, are well known in the art.

A plurality of different modulator designs are suitable for use in conjunction with the present invention. It should be understood, however, that in preferred embodiments in which an incoming optical signal is received by the optical modulator 32 before the photodetector 42, the optical modulator must have at least one state in which it is substantially transparent or transmissive to the incoming optical signal. In such a transmissive state, the incoming optical signal, such as the incoming optical signal 16, passes through the optical modulator 32 and the substrate 34a–d, and is received by the photodetector 42.

Figure 8:
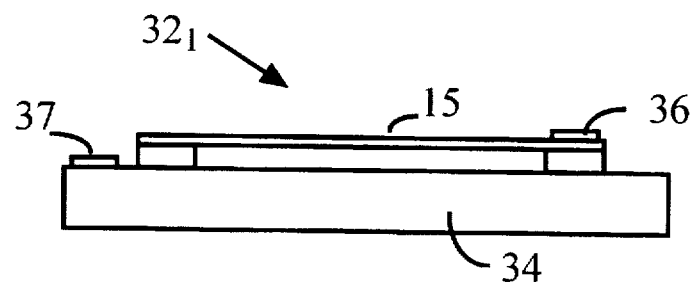
FIG. 8 illustrates an optical modulator suitable for use in conjunction with the present invention.

In a preferred embodiment of an optical modulator 32 for use in conjunction with the present invention, the optical modulator is a micromechanical modulator $32_1$. An exemplary micromechanical optical modulator $32_1$ is shown in FIG. 8. The optical modulator $32_1$ has a movable layer 15 that is supported over a region of a substrate 34. Wire bond pads or contacts 36 and 37 are in electrical communication with the movable layer 15 and the substrate 34, respectively. The contacts 36 and 37 are further in electrical communication with a controlled voltage source (not pictured).

In operation, a voltage is applied to the substrate 34 and the movable layer 15 via the controlled voltage source. The applied voltage generates an electrostatic force that causes the movable layer 15 to move towards the substrate from an initial quiescent position. As the movable layer 15 moves, there is a change in an optical property of the optical modulator $32_1$. Such a change is exploited to alter a measurable characteristic of an optical signal incident upon the modulator.

In a preferred embodiment, the changeable optical property is the reflectivity of the optical modulator $32_1$. A change in the reflectivity of the modulator $32_1$ results in a change in the measured amplitude of an optical signal returned from the modulator. By controlling the movement of the movable layer 15, an optical signal can thus be modulated.

Exemplary embodiments of micromechanical optical modulators $32_1$ suitable for use in conjunction with preferred embodiments of the present invention, and which operate substantially as described above, include those disclosed in U.S. Pat. No. 5,500,761, and copending U.S. patent applications Ser. No. 08/283,106 filed Jul. 29, 1994, Ser. No. 08/578,590 filed Jun. 7, 1995, Ser. No. 08/479,476 filed Jun. 7, 1995, Ser. No. 08/578,123 filed Dec. 26, 1995, Ser. No. 08/565,453 and Ser. No. 08/597,003, all of which are assigned to the present assignee. The aforementioned patent and patent applications, as well as any publications mentioned elsewhere in this specification, are incorporated herein by reference.

In other embodiments of an OMP 20, other types of micromechanical optical modulators can be used. In still further embodiments, semiconductor optical modulators can be used.

Returning to a description of the OMP 20, the substrates 34a–d shown in FIGS. 3–6, respectively, provide the function provided by the substrate 34 for the micromechanical optical modulator $32_1$ of FIG. 8. Contacts 36a–d and 37a–d pictured in FIGS. 3–6 are likewise analogous to the contacts 36 and 37 shown in FIG. 5. The contacts 36a–d, which are in electrical contact with the movable layer 15 of the modulator 32a–d, must be electrically isolated from the substrates 34a–d, respectively.

Figure 9:
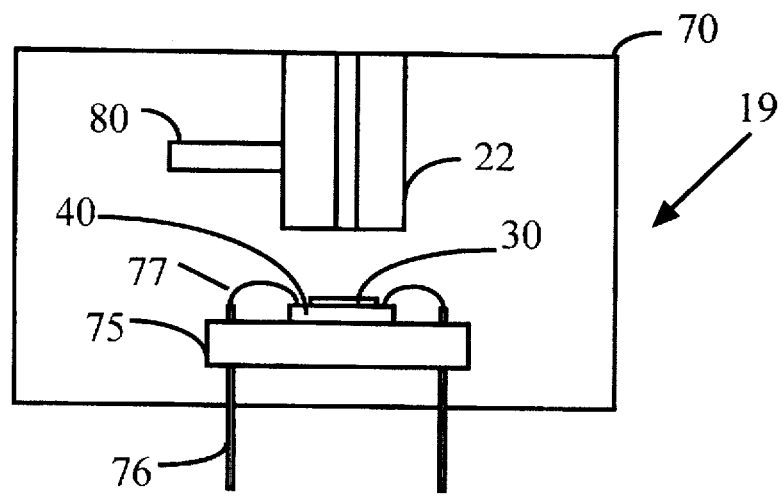
FIG. 9 shows the combined optical modulator/detector packaged in a container with an electrical header and an optical fiber.

In a further embodiment of the present invention, an OMP, such as the OMPs 20a–d, can be incorporated into a photonics package 19. The photonics package 19, illustrated in FIG. 9, includes an OMP, an electrical header 75, a container 70 and, optionally, an optical fiber 22. In one embodiment, the photonics package 19 can be made by first gluing the photodetector chip to the electrical header 75. The electrical header 75 provides electrical connection between the optical modulator 32, photodetector 42, and other processing components located within or outside of the photonics package 19. For example, electrical contact between the contacts 36a–d and 37a–d of the optical modulator chips 30a–d, respectively, and the controlled voltage source can be effected via the electrical header 75. Wires 77 bonded to those contacts are attached to conductive pins 76 depending from the electrical header 75. In FIG. 9, only two of the contacts are shown for clarity. Wires are similarly connected between contacts 46a–d, 47a–d of the photodetector chip and the electrical header 75.

The electrical header 75, with photodetector chip attached, is then placed in a retaining/aligning apparatus capable of small, precisely-controlled movements. Epoxy is applied to the optical modulator chip or the photodetector chip, as appropriate. The optical modulator chip 30 is then aligned with the photodetector chip 40 by precisely adjusting the retaining/aligning apparatus. The epoxy is then activated by exposure to UV or heat, as appropriate for the epoxy, and the chips are pressed together. If the optional optical fiber 22 is to be included in the photonics package 19, the fiber is aligned with the modulator 32 according to well known methods and is epoxied to a post 80 or other alignment/support member. The OMP 20, fiber 22 and electrical header are then placed in the container 70. The container 70, which is preferably metal or plastic, can be heremetically sealed if desired. The conductive pins 76, or conductive elements in electrical connection therewith, extend outside of the container 70 for connection to appropriate electronics.

In a further embodiment, the controlled voltage source for generating the electrostatic force can be included in the single photonics package 19.

In a further embodiment of the present invention, the photodetector 42 can be used to optimize the optical modulator's performance. As described above, in the preferred embodiment of a micromechanical optical modulator $32_1$ in which the changeable property is reflectivity, such reflectivity is a function of the position of the movable layer. More particularly, a relative maxima in reflectivity is obtained at predictable layer positions and relative minima are obtained at other predictable positions. Optimum modulator operation, that is, maximum contrast, is achieved when the movable layer moves between the relative minima and relative maxima positions, as dictated by the control electronics. It will be appreciated that the amount of movement or deflection of the movable layer is a function of the magnitude of the voltage applied across the movable layer 15 and the substrate 34. It should also be understood that due to modulator to modulator variation, such as the tension in the movable layer 15, the voltage requirement for a particular deflection will vary from modulator to modulator. Furthermore, as a modulator ages, the voltage requirements may vary.

Figure 10:
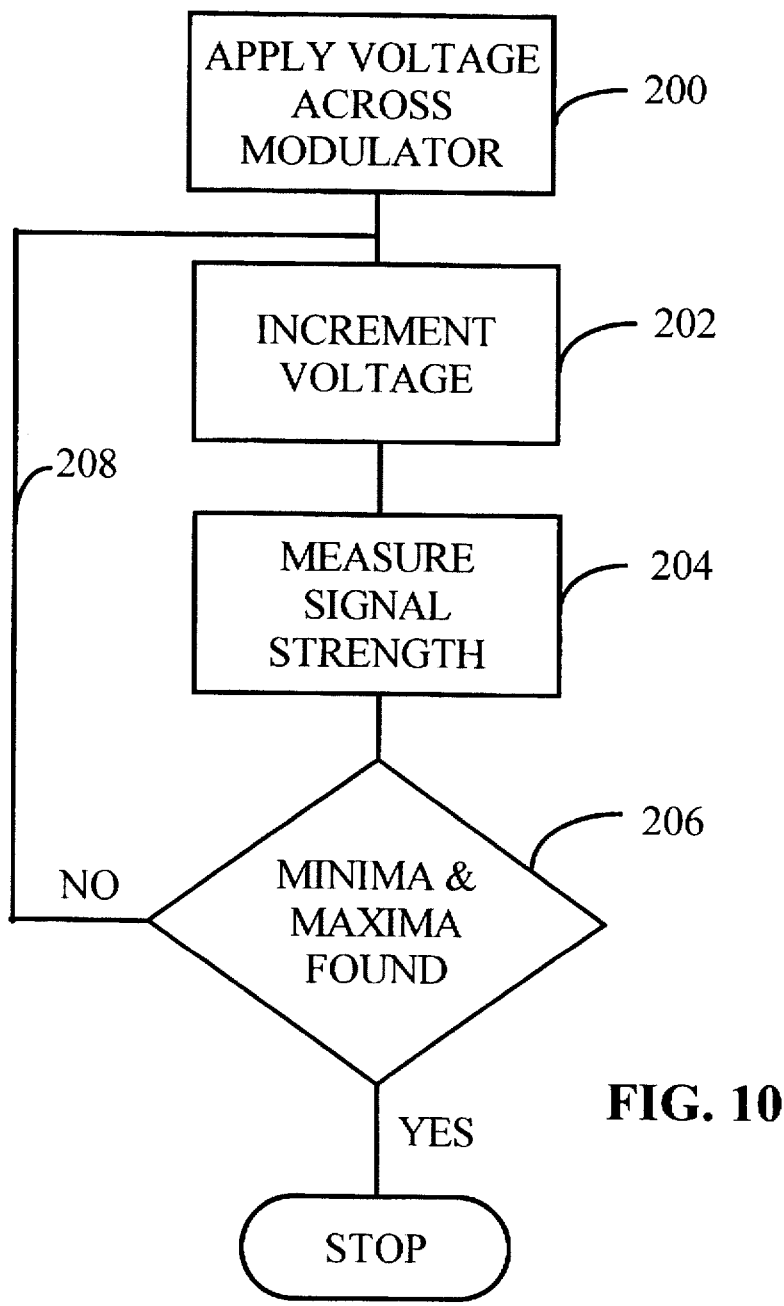
FIG. 10 is a flow chart illustrating an embodiment of a method for optimizing micromechanical optical modulator operation.

By measuring the strength of the optical signal received at the photodetector 42 for different voltages applied to the modulator $32_1$ optimum operating voltages can be determined. Specifically, a maximum signal strength at the photodetector 42 corresponds to a minimum reflectivity for the modulator. Conversely, a minimum signal strength at the photodetector 42 corresponds to a maximum reflectivity for the modulator $32_1$. Moreover, to account for aging effects, such an optimization procedure can be repeated at periodic intervals. An exemplary method for determining the optimum operating voltage for the modulator is illustrated in FIG. 10.

According to the method, an optical signal is placed in optical communication with the optical modulator $32_1$ of the OMP. As indicated in operation block 200, a voltage is applied across the modulator $32_1$ and the signal strength is measured at the photodetector 42. After incrementing the voltage, as noted in operation block 202, the signal strength at the photodetector is again measured, per operation block 204. Decision block 206 queries whether a maxima and a minima signal strength have been measured. If not, processing returns to operation block 202 via loop back 208. If a maxima and a minima have been determined, then no further measurements need be taken.

The OMP 20 is well suited to optimizing modulator operation since the optical path between the modulator and the photodetector is quite small so that minimum signal attenuation will occur.

Although a number of specific embodiments of this invention have been shown and described herein, it is to be understood that such embodiments are merely illustrative of the many possible specific arrangements that can be devised in application of the principles of the invention. Numerous and varied other arrangements can be devised in accordance with these principles by those of ordinary skill in the art without departing from the scope and spirit of the invention. For example, while in the Figures, the photodetector chip is shown as being larger than the modulator chip, these sizes could be reversed. In fact, since III–V substrates tend to be more brittle than nonpolar substrates, such as silicon, using the latter as the carrier results in a more robust handling configuration. Moreover, in certain preferred embodiments described herein, the single-package optical modulators/photodetectors incorporate a single optical fiber. In other embodiments, however, the packages may include more than one fiber, or may not include any optical fibers. In the latter case, the package includes a fiber alignment for receiving a fiber from the optical communications system into which the package is being integrated.

We claim:

1. A device for processing an optical signal, comprising:
    an optical modulator chip characterized by a first and a second surface, the optical modulator chip having an optical modulator and at least one modulator contact for electrically connecting the optical modulator to a controlled voltage source, wherein the optical modulator is operable to receive the optical signal delivered to the device and to modulate it; and
    a photodetector chip attached to the optical modulator chip, the photodetector chip having a photodetector disposed on a first surface thereof, and further having at least one photodetector contact for electrically connecting the photodetector to processing electronics; wherein
    the optical modulator chip and the photodetector chip are attached by an attachment material that is in contact with the second surface of the optical modulator chip and the first surface of the photodetector chip.

2. The device of claim 1 wherein the optical modulator is in optical communication with an optical fiber.

3. The device of claim 1 wherein the optical modulator is disposed on the first surface of the optical modulator chip.

4. The device of claim 1 wherein the optical modulator is disposed on the second surface of the optical modulator chip.

5. The device of claim 1 wherein the attachment material is a non-conductive epoxy.

6. The device of claim 1 wherein the attachment material is solder.

7. The device of claim 4 wherein the first surface of the optical modulator chip is physically adapted to receive an optical fiber.

8. The device of claim 7 wherein the physical adaptation is a well.

9. The device of claim 1 wherein an antireflection layer is disposed on the second surface of the modulator chip and the first surface of the photodetector chip.

10. The device of claim 1 further comprising an electrical header attached a second surface of the photodetector chip, the electrical header for providing electrical connection between the optical modulator and processing equipment and the photodetector and processing equipment.

11. The device of claim 10 further comprising a container for retaining the electrical header and the attached photodetector chip and optical modulator chip.

12. The device of claim 11 further comprising an optical fiber in optical communication with the optical modulator and extending outside of the container.

13. The device of claim 11 further comprising an optical fiber alignment for receiving an optical fiber, wherein the optical fiber alignment places the optical fiber into optical communication with the optical modulator.

14. The device of claim 1 wherein the optical modulator is a micromechanical optical modulator.

15. The device of claim 1 wherein the optical modulator is a semiconductor optical modulator.

16. A single-package optical modulator/photodetector for processing an optical signal originating from an external source, comprising:
   a combined optical modulator/photodetector operable to process the externally-originating optical signal, wherein the combined optical modulator/photodetector comprises an optical modulator chip and a photodetector chip that are attached to one another;
   an electrical header for electrically connecting the optical modulator chip and the photodetector chip to processing electronics;
   a container for retaining the electrical header and the combined optical modulator/photodetector; and
   means for receiving the optical signal.

17. The single-package optical modulator/photodetector of claim 1 wherein the means for receiving the optical signal is an optical fiber.

18. The single-package optical modulator/photodetector of claim 1 wherein the means for receiving the optical signal is an optical fiber alignment.

19. An optical communications system comprising:
   an optical fiber for carrying a first optical communications signal;
   an optical fiber connector that is connected, at a first end, to the optical fiber;
   a single-package optical modulator/photodetector, comprising:
      a combined optical modulator/photodetector, the combined optical modulator/photodetector including an optical modulator chip and a photodetector chip that are attached to one another, the combined optical modulator/photodetector capable of converting the first optical communcations signal into an electrical signal and further generating a second optical communications signal by modulating the first optical communications signal;
      an electrical header for electrically connecting the optical modulator chip and the photodetector chip to processing electronics;
      a container for retaining the electrical header and the combined optical modulator/photodetector; and
      a waveguide in optical communication with a second end of the optical fiber connector and the optical modulator chip; and
   processing electronics connected to the electrical header, the processing electronics operable to process the electrical signal from the combined optical modulator/photodetector and to control the combined optical modulator/photodetector to modulate the optical communications signal.

20. A method for processing an optical signal carrying a first quantity of information in an optical communications system, the optical communications system including a combined optical modulator/photodetector in optical communication with the optical signal, the combined optical modulator/photodetector comprising an optical modulator chip having an optical modulator for encoding a second quantity of information on the optical signal, and a photodetector chip having a photodetector for converting at least a portion of the optical energy of the optical signal into an electrical signal representative of the optical signal and the first quantity of information carried thereon, wherein the optical modulator chip and the photodetector chip are attached to one another and, in an at least partially transmissive state of the optical modulator, the photodetector and the optical modulator are in optical communication, comprising the steps of:
   (a) placing the optical modulator in the at least partially transmissive state so that at least some optical energy of the optical signal is received by the photodetector;
   (b) generating an electrical signal representative of the optical signal;
   (c) delivering the electrical signal generated by the photodetector to processing electronics for processing the first quantity of information carried by the optical signal, and
   (d) encoding the second quantity of information on the optical signal using the optical modulator.

21. A method for optimizing the performance of a micromechanical optical modulator comprising the steps of:
   (a) placing the modulator in optical communication with a photodetector and an optical signal so that the optical signal is received first by the modulator;
   (b) applying a voltage to the modulator;
   (c) measuring the amplitude of the optical signal at the photodetector;
   (d) repeating steps (b) and (c) until a minima and maxima in signal amplitude is observed at the photodetector; wherein,
   the voltages corresponding to the minima and maxima signal strength correspond to the optimum operating voltages of the micromechanical optical modulator.

22. The method of claim 21 wherein step (a) further comprises providing a combined optical modulator/photodetector comprising:
   an optical modulator chip characterized by a first and a second surface, the optical modulator chip having an optical modulator disposed on one of either the first or second surface thereof; and
   a photodetector chip attached to the optical modulator chip, the photodetector chip having a photodetector disposed on a first surface thereof; wherein
   the optical modulator chip and the photodetector chip are attached by an attachment material that is in contact with the second surface of the optical modulator chip and the first surface of the photodetector chip.

* * * * *